US009277458B2

(12) United States Patent
Ait-Ameur et al.

(10) Patent No.: US 9,277,458 B2
(45) Date of Patent: *Mar. 1, 2016

(54) LONG TERM EVOLUTION (LTE) MOBILE ANCHORING

(71) Applicant: VERIZON PATENT AND LICENSING, INC., Basking Ridge, NJ (US)

(72) Inventors: Samir Ait-Ameur, Fremont, CA (US); Imtiyaz Shaikh, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/068,350

(22) Filed: Oct. 31, 2013

(65) Prior Publication Data

US 2014/0056284 A1    Feb. 27, 2014

Related U.S. Application Data

(63) Continuation of application No. 12/631,420, filed on Dec. 4, 2009, now Pat. No. 8,576,815.

(51) Int. Cl.
*H04W 4/00* (2009.01)
*H04W 36/00* (2009.01)
*H04W 36/08* (2009.01)
*H04W 36/02* (2009.01)

(52) U.S. Cl.
CPC .......... *H04W 36/0016* (2013.01); *H04W 36/08* (2013.01); *H04W 36/02* (2013.01)

(58) Field of Classification Search
CPC .. H04W 36/0016; H04W 36/08; H04W 36/02
USPC ........................................................ 370/338
See application file for complete search history.

(56) References Cited

U.S. PATENT DOCUMENTS

| | | | | |
|---|---|---|---|---|
| 6,041,235 | A * | 3/2000 | Aalto | H04W 36/20 455/437 |
| 6,985,736 | B1 * | 1/2006 | Aalto | H04W 36/20 455/444 |
| 8,200,221 | B2 * | 6/2012 | Trolli | H04W 36/0094 455/435.2 |
| 2004/0121774 | A1 | 6/2004 | Rajkotia et al. | |
| 2005/0048974 | A1 * | 3/2005 | Kim | H04W 36/0083 455/436 |
| 2005/0090257 | A1 * | 4/2005 | Kroner | H04L 12/24 455/436 |
| 2006/0166677 | A1 * | 7/2006 | Derakshan | H04W 36/14 455/453 |
| 2007/0153794 | A1 | 7/2007 | Smith et al. | |
| 2007/0160072 | A1 | 7/2007 | Thalanany et al. | |
| 2007/0206539 | A1 | 9/2007 | Yegani et al. | |
| 2008/0014957 | A1 * | 1/2008 | Ore | H04W 36/0088 455/452.1 |
| 2008/0318575 | A1 | 12/2008 | Ulupinar et al. | |
| 2009/0061892 | A1 | 3/2009 | Lee et al. | |
| 2009/0233604 | A1 | 9/2009 | Sayeedi | |
| 2010/0039987 | A1 | 2/2010 | Hegde et al. | |
| 2010/0069066 | A1 | 3/2010 | Shen et al. | |
| 2010/0195621 | A1 | 8/2010 | Kekki et al. | |

* cited by examiner

*Primary Examiner* — Shripal Khajuria
*Assistant Examiner* — Faisal Choudhury (57) ABSTRACT

A device receives roaming information associated with a user equipment (UE), a current eNodeB conducting a current Internet protocol (IP) session with the UE, and a plurality of eNodeBs that are neighboring the current eNodeB. The device also selects, based on the roaming information and from the plurality of eNodeBs, an optimal eNodeB to which to handover the UE, and establishes a preemptive IP session with the optimal eNodeB. The device further initiates a handover of the current IP session and the UE from the current eNodeB to the optimal eNodeB, where the current eNodeB acts as an anchoring point for a bearer path associated with the UE during the handover.

20 Claims, 11 Drawing Sheets

LONG TERM EVOLUTION (LTE) MOBILE ANCHORING

RELATED APPLICATION

This application is a continuation of U.S. patent application Ser. No. 12/631,420, filed Dec. 4, 2009, the disclosure of which is incorporated herein by reference.

BACKGROUND

Current Long Term Evolution (LTE)-based networks include a variety of devices, such as eNodeBs (eNBs), mobility management entities (MMEs), packet gateways (PGWs), and serving gateways (SGW). Current Third Generation Partnership Project (3GPP) and LTE standards require the PGW to function or serve as an anchoring point for any user equipment (UEs). However, the PGW anchoring function is static and cannot be combined with the functionality of the SGW, the MMEs, and/or the eNBs. Furthermore, anchoring UEs (e.g., anchoring bearer paths associated with UEs) at a particular PGW increases transport cost and resource utilization at the particular PGW. This causes network transport and PGW resources to be inefficient at handling large traffic loads exchanged between at least two eNBs when a UE is roaming and the UE's bearer path is localized to the nearest eNB.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that may permit a UE to roam from a particular eNB to at least another eNB by anchoring the UE's bearer path to the particular eNB and by preserving the UE's IP session and IP address. The systems and/or methods may enable the anchoring eNB to inherit the anchoring functionality and intelligence of a PGW so that the anchoring eNB may act as a localized anchor point to the UE. The systems and/or methods may permit the anchoring eNB to handle a roaming UE and to seamlessly reassign the same IP address to the UE without losing the UE's bearer path or an original configuration of the UE's IP session setup. The systems and/or methods may enable eNBs to keep track of IP sessions, IP addresses, and/or corresponding roaming information associated with UEs. The systems and/or methods may also provide a dynamic IP provider that may manage a list of assigned IP addresses for the eNBs. The dynamic IP provider may maintain a current state of the assigned IP addresses, via eNBs attached to the dynamic IP provider. The dynamic IP provider may maintain a pool of IP addresses that may be used when a roaming UE performs a handover from one eNB to another eNB. The dynamic IP provider may signal, to its attached eNBs, corresponding IP addresses of UEs that are roaming between the attached eNBs.

In one exemplary implementation, the dynamic IP provider may receive information associated with a current IP session and roaming information associated with a UE, a current eNB (e.g., conducting the current IP session with the UE), and neighbor eNBs (e.g., neighboring the current eNB). The dynamic IP provider may select, based on the received information and from the neighbor eNBs, an optimal eNB to which to handover the UE, and may setup a preemptive IP session with the optimal eNB. Furthermore, the dynamic IP provider may select, based on the received information and from the neighbor eNBs, an alternate eNB (e.g., in case the optimal eNB is unavailable) to which to handover the UE, and may setup an alternate IP session with the alternate eNB. The dynamic IP provider may instruct a handover of the current IP session and the UE from the current eNB to the optimal eNB, and may obtain an IP session acknowledgement and connectivity status information from the optimal eNB. The dynamic IP provider may remove the current IP session from an active IP session pool (e.g., a pool of IP addresses that may be used when a roaming UE performs a handover from one eNB to another eNB), and may record information associated with the optimal eNB.

As used herein, the term "user" is intended to be broadly interpreted to include user equipment (UE) or a user of user equipment.

Figure 1:
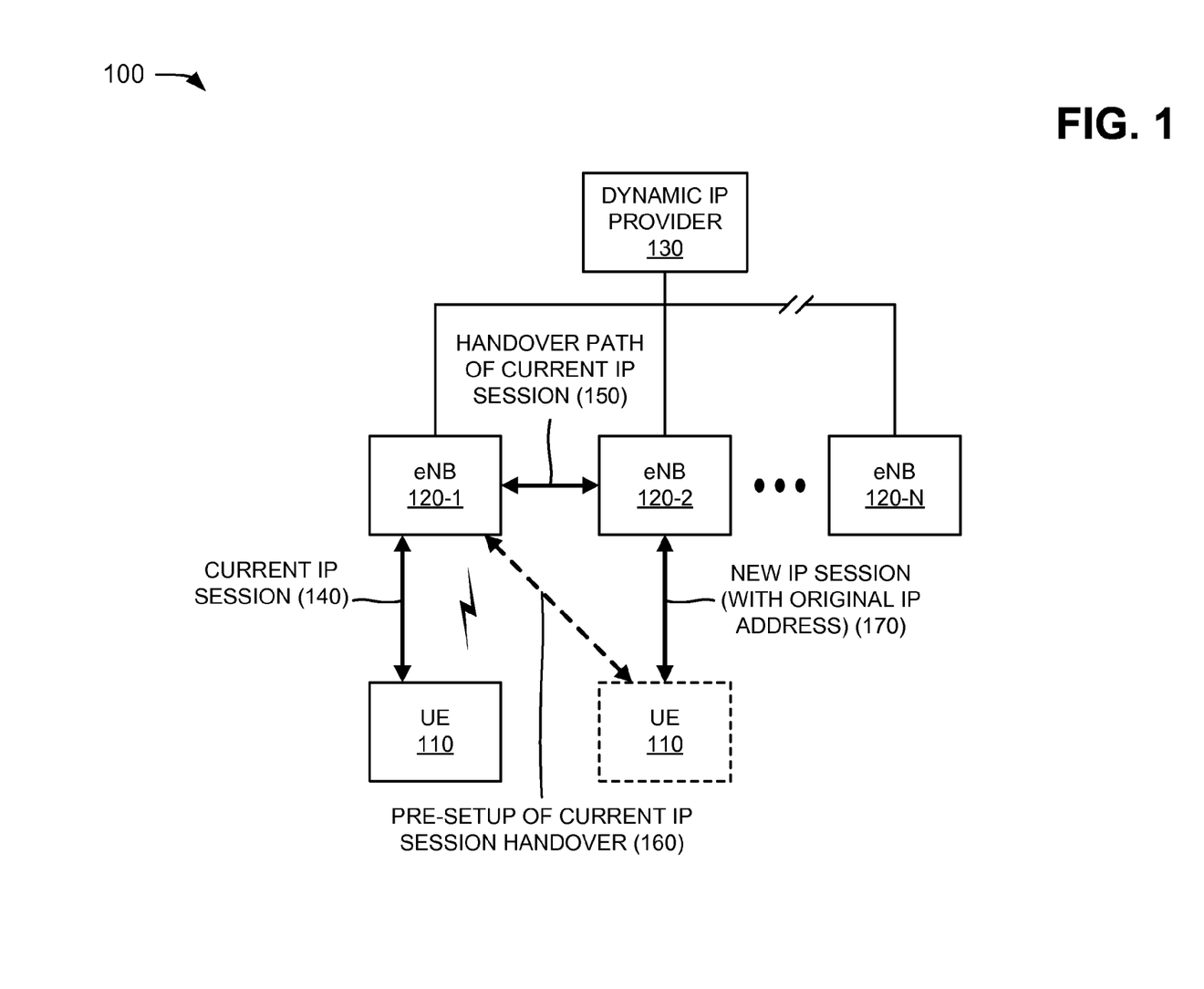
FIG. 1 is a diagram of an exemplary network in which systems and/or methods described herein may be implemented.

FIG. 1 is a diagram of an exemplary network 100 in which systems and/or methods described herein may be implemented. As illustrated, network 100 may include a user equipment (UE) 110, a group of eNodeBs (eNBs) 120-1 through 120-N (referred to collectively as "eNBs 120" and in some instances, individually as "eNB 120"), and a dynamic IP provider 130. Components of network 100 may interconnect via wired and/or wireless connections. A single UE 110, three eNBs 120, and a single dynamic IP provider 130 have been illustrated in FIG. 1 for simplicity. In practice, there may be more UEs 110, eNBs 120, and/or dynamic IP providers 130. Also, in some instances, one or more of the components of network 100 may perform one or more functions described as being performed by another one or more of the components of network 100. In one exemplary implementation, network 100 may correspond to a portion of a LTE-based network.

UE 110 may include a radiotelephone, a personal communications system (PCS) terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer (e.g., with a broadband air card), or other types of mobile communication devices. In an exemplary implementation, UE 110 may include one or more computation and/or communication devices capable of sending/receiving voice and/or data to/from eNBs 120.

eNB 120 may include one or more computation and/or communication devices that receive voice and/or data (e.g., from an MME and/or a SGW) and transmit that voice and/or data to UE 110 via an air interface. eNB 120 may also include one or more devices that receive voice and/or data from UE 110 over an air interface and transmit that voice and/or data to other UEs (e.g., or to an MME and/or a SGW).

Dynamic IP provider 130 may include one or more computation and/or communication devices that manage a list of assigned IP addresses for eNBs 120, and maintain a current state of the assigned IP addresses via eNBs 120. Dynamic IP provider 130 may maintain a pool of IP addresses that may be used when a roaming UE 110 performs a handover from one eNB 120 to another eNB 120. Dynamic IP provider 130 may signal, to eNBs 120, corresponding IP addresses of UEs that are roaming between eNBs 120.

As further shown in FIG. 1, UE 110 may initially be communicating with eNB 120-1 and may have established a current IP session 140 with eNB 120-1. Current IP session 140 may include an IP session currently established with eNB 120-1 via an original IP address associated with UE 110. UE 110 may roam from eNB 120-1 to another eNB (e.g., eNB 120-2). For example, UE 110 may physically move from a location that is closest to eNB 120-1 to a location that is closest to eNB 120-2. After moving, UE 110 may best be served by eNB 120-2 (e.g., since it is the closest eNB 120 to UE 110) rather than by eNB 120-1.

In one exemplary implementation, dynamic IP provider 130 may receive information associated with current IP session 140 and roaming information associated with UE 110, a current eNB 120 (e.g., eNB 120-1), and neighbor eNBs 120 (e.g., eNBs 120-2 through 120-N). Dynamic IP provider 130 may select, based on the received information and from the neighbor eNBs 120, an optimal eNB 120 (e.g., eNB 120-2) to which to handover UE 110, and may setup a preemptive IP session with the optimal eNB 120-2. For example, dynamic IP provider 130 may cause a handover path 150 of current IP session 140 to be established between eNB 120-1 and 120-2, and may cause eNB 120-1 to initiate a pre-setup 160 (e.g., with UE 110) of a handover of current IP session 140 and UE 110. Handover path 150 may permit eNBs 120-1 and 120-2 to communicate information (e.g., information associated with current IP session 140, roaming information associated with UE 110, etc.) with each other. Pre-setup 160 may permit UE 110 and eNB 120-1 to communicate information (e.g., information associated with eNB 120-2, etc.) that may enable UE 110 to handover current IP session 140 to eNB 120-2. In an exemplary implementation, a bearer path associated with UE 110 may remain anchored to eNB 120-1 during the handover to eNB 120-2.

Alternatively or additionally, dynamic IP provider 130 may select, based on the received information (e.g. information associated with current IP session 140 and roaming information associated with UE 110, eNB 120-1, and neighbor eNBs 120-2 through 120-N) and from neighbor eNBs 120, an alternate eNB (e.g., eNB 120-N, in case eNB 120-2 is unavailable) to which to handover UE 110. Dynamic IP provider may setup an alternate IP session with the alternate eNB 120-N. Dynamic IP provider 130 may instruct a handover of current IP session 140 and UE 110 from eNB 120-1 to the optimal eNB 120-2, and a new IP session 170 may be established between UE 110 and eNB 120-2. New IP session 170 may preserve current IP session 140 and the original IP address associated with UE 110. Dynamic IP provider 130 may obtain an IP session (e.g., new IP session 170) acknowledgement and connectivity status information from the optimal eNB 120-2. Dynamic IP provider 130 may remove current IP session 140 from an active IP session pool, and may record information associated with the optimal eNB 120-2.

Although FIG. 1 shows exemplary components of network 100, in other implementations, network 100 may contain fewer, different, differently arranged, or additional components than depicted in FIG. 1. In one exemplary implementation, network 100 may include one or more MMEs, PGWs, SGWs, etc.

Figure 2:
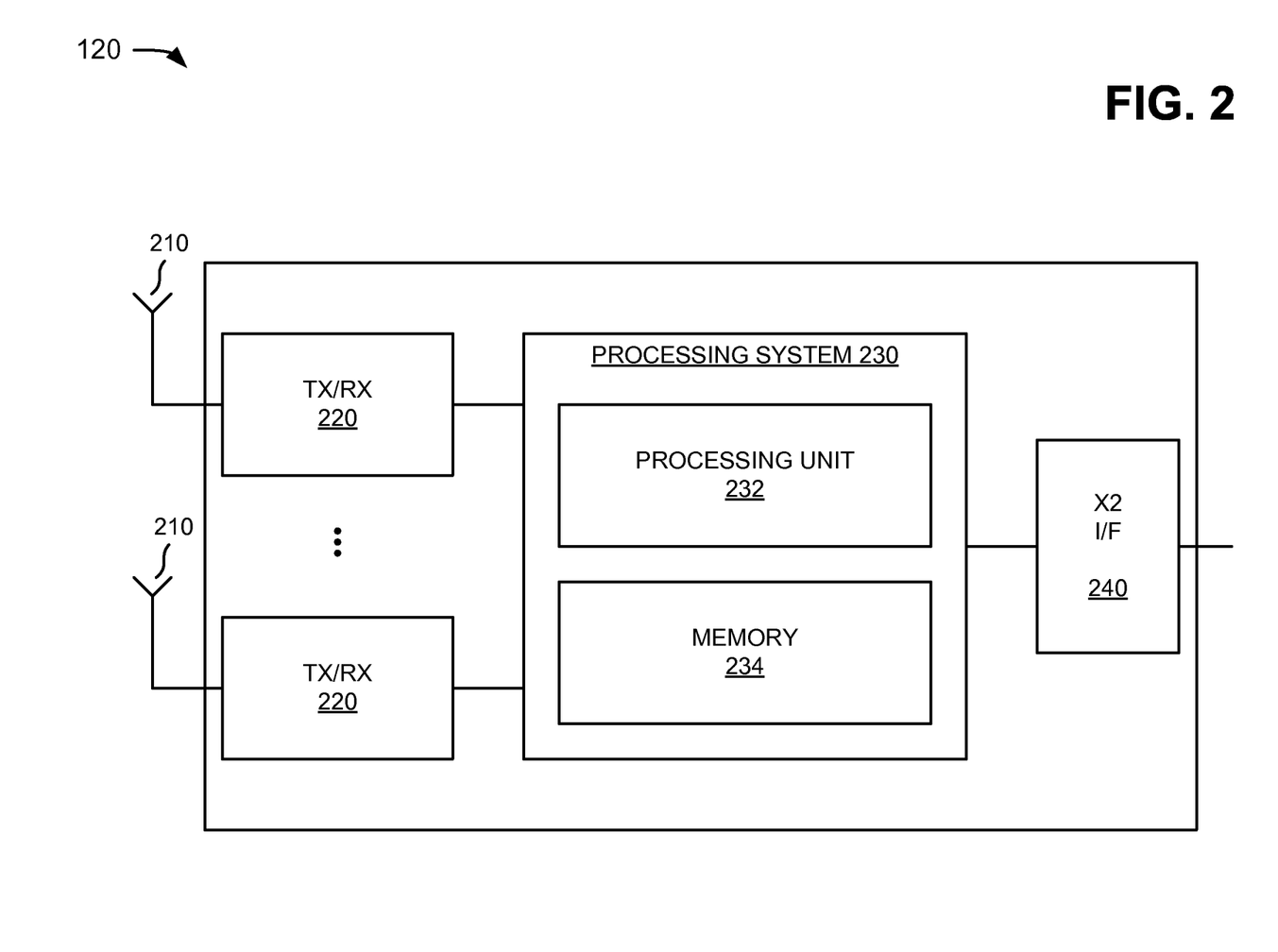
FIG. 2 is a diagram of exemplary components of an eNB of the network depicted in FIG. 1.

FIG. 2 is a diagram of exemplary components of eNB 120. As shown in FIG. 2, eNB 120 may include antennas 210, transceivers (TX/RX) 220, a processing system 230, and an X2 interface (I/F) 240.

Antennas 210 may include one or more directional and/or omni-directional antennas. Transceivers 220 may be associated with antennas 210 and may include transceiver circuitry for transmitting and/or receiving symbol sequences in a network, such as network 100, via antennas 210.

Processing system 230 may control the operation of eNB 120. Processing system 230 may also process information received via transceivers 220 and/or X2 interface 240. As illustrated in FIG. 2, processing system 230 may include a processing unit 232 and a memory 234. Processing unit 232 may include one or more processors, microprocessors, application specific integrated circuits (ASICs), field programmable gate arrays (FPGAs), or the like. Processing unit 232 may process information received via transceivers 220 and/or X2 interface 240. In addition, processing unit 232 may transmit control messages and/or data messages, and may cause those control messages and/or data messages to be transmitted via transceivers 220 and/or X2 interface 240. Processing unit 232 may also process control messages and/or data messages received from transceivers 220 and/or X2 interface 240. Memory 234 may include a random access memory (RAM), a read-only memory (ROM), and/or another type of memory to store data and instructions that may be used by processing unit 232.

X2 interface 240 may include one or more line cards that allow eNB 120 to transmit data to and receive data from another eNB 120 or dynamic IP provider 130. In one example, X2 interface 240 may enable eNBs 120 to exchange information related to performing a handover operation.

As described herein, eNB 120 may perform certain operations in response to processing unit 232 executing software instructions contained in a computer-readable medium, such as memory 234. A computer-readable medium may be defined as a physical or logical memory device. A logical memory device may include memory space within a single physical memory device or spread across multiple physical memory devices. The software instructions may be read into memory 234 from another computer-readable medium or from another device via antennas 210 and transceivers 220. The software instructions contained in memory 234 may cause processing unit 232 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of eNB 120, in other implementations, eNB 120 may contain fewer, different, differently arranged, or additional components than depicted in FIG. 2. Alternatively or additionally, one or more components of eNB 120 may perform one or more other tasks described as being performed by one or more other components of eNB 120.

Figure 3:
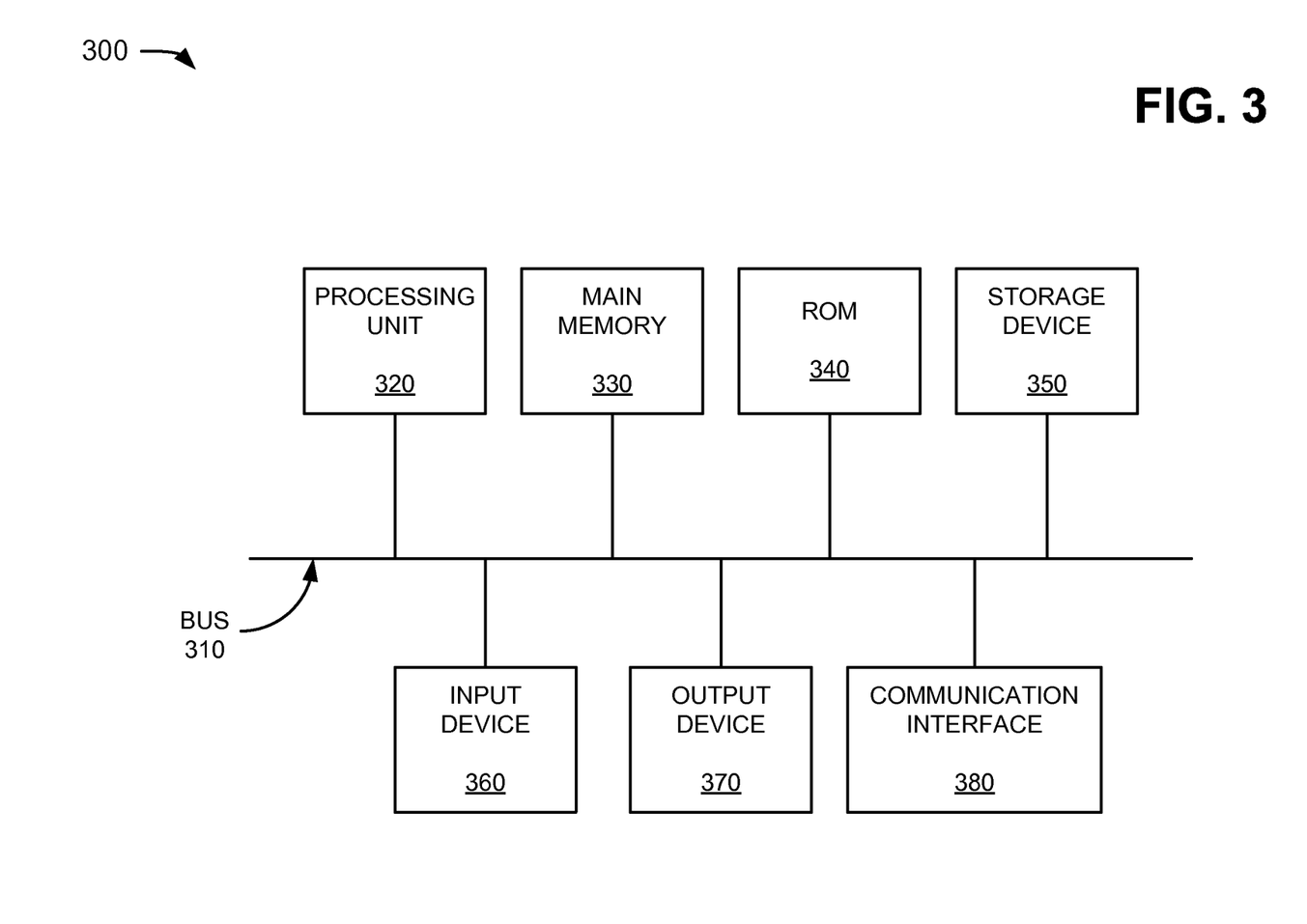
FIG. 3 is a diagram of exemplary components of a dynamic Internet protocol (IP) provider of the network depicted in FIG. 1.

FIG. 3 depicts a diagram of exemplary components of a device 300 that may correspond to dynamic IP provider 130. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, ASICs, FPGAs, or other types of processors that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, a touch screen, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 100.

As described herein, device 300 may perform certain operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, or additional components than depicted in FIG. 3. Alternatively or additionally, one or more components of device 300 may perform one or more other tasks described as being performed by one or more other components of device 300.

Figure 4:
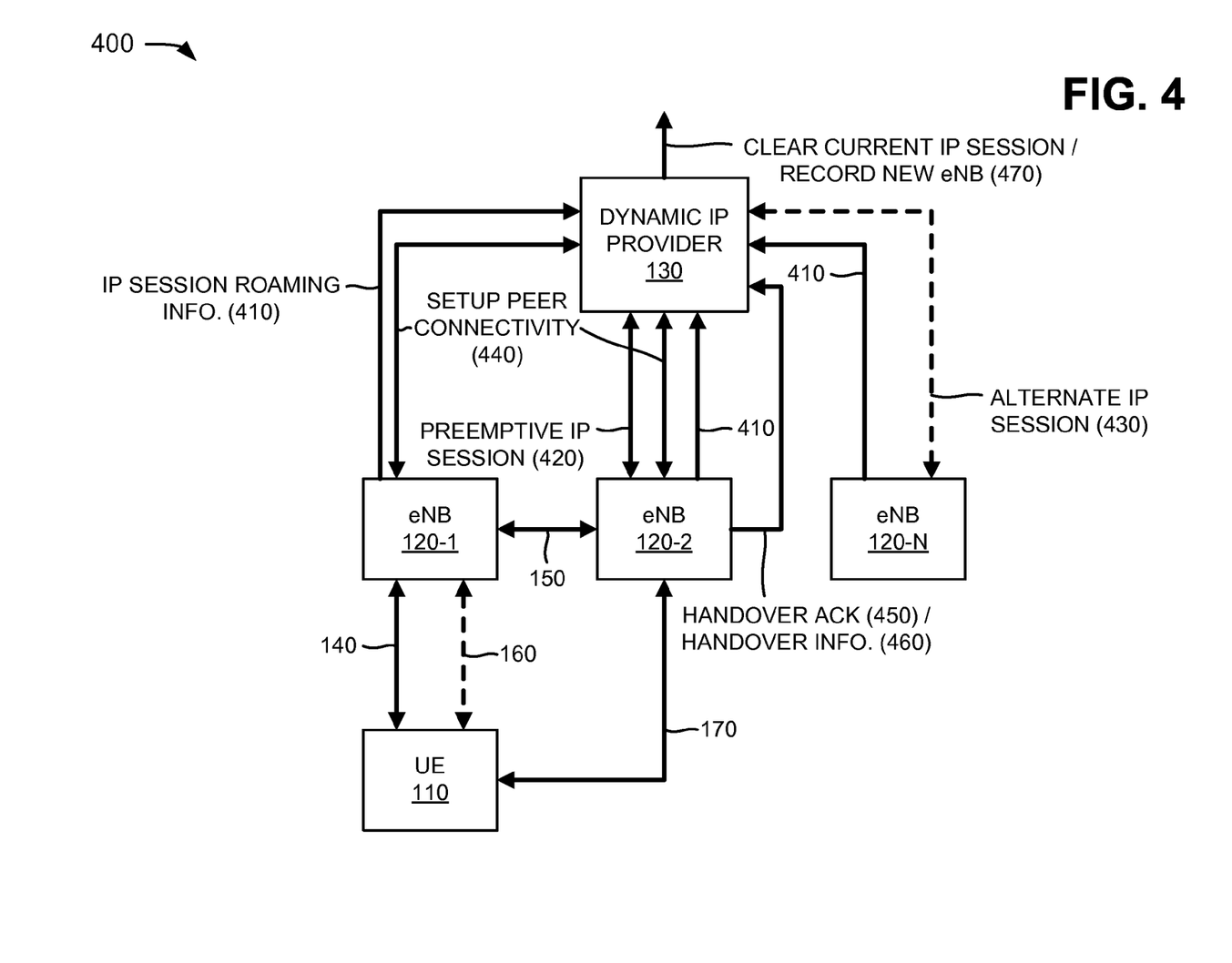
FIG. 4 is a diagram of exemplary interactions among components of an exemplary portion of the network depicted in FIG. 1.

FIG. 4 is a diagram of exemplary interactions among components of an exemplary portion 400 of network 100. As illustrated in FIG. 4, exemplary network portion 400 may include UE 110, eNBs 120-1, 120-2, and 120-N, and dynamic IP provider 130. UE 110 may include the features described above in connection with, for example, FIG. 1. eNBs 120-1, 120-2, and 120-N may include the features described above in connection with, for example, FIGS. 1 and 2. Dynamic IP provider 130 may include the features described above in connection with, for example, FIGS. 1 and 3.

As further shown in FIG. 4, dynamic IP provider 130 may receive IP session roaming information 410 from eNBs 120-1, 120-2, and 120-N. IP session roaming information 410 may include location coordinates and related roaming data associated with UEs connected to eNBs 120-1, 120-2, and 120-N, information associated with current IP session 140 between UE 110 and eNB 120-1, etc. Dynamic IP provider 130 may select from neighbor eNBs 120 (e.g., eNB 120-2 and 120-N), based on IP session roaming information 410, an optimal eNB 120 (e.g., eNB 120-1) to which to handover UE 110, and may setup a preemptive IP session 420 with the optimal eNB 120-2. For example, dynamic IP provider 130 may cause handover path 150 of current IP session 140 to be established between eNB 120-1 and 120-2, and may cause eNB 120-1 to initiate pre-setup 160 (e.g., with UE 110) of a handover of current IP session 140 and UE 110. In an exemplary implementation, a bearer path associated with UE 110 may remain anchored to eNB 120-1 during the handover to eNB 120-2. Alternatively or additionally, dynamic IP provider 130 may select, based on IP session roaming information 410 and from neighbor eNBs 120 (e.g., eNB 120-2 and 120-N), an alternate eNB (e.g., eNB 120-N, in case eNB 120-2 is unavailable) to which to handover UE 110, and may setup an alternate IP session 430 with the alternate eNB 120-N.

Dynamic IP provider 130 may setup requests to establish peer connectivity between UE 110, eNB 120-1 (e.g., UE's 110 current anchoring eNB 120), and the optimal eNB 120-2, as indicated by reference number 440. Once the peer connectivity setup requests have been established between UE 110, eNB 120-1, and eNB 120-2, dynamic IP provider 130 may instruct a handover of current IP session 140 and UE 110 from eNB 120-1 to the optimal eNB 120-2, and new IP session 170 may be established between UE 110 and eNB 120-2. Dynamic IP provider 130 may obtain a handover acknowledgement 450 and handover information 460 from eNB 120-2. Handover acknowledgement 450 may include an acknowledgement that new IP session 170 has been established between UE 110 and eNB 120-2. Handover information 460 may include, for example, connectivity status information associated with UE 110 and eNB 120-2. Dynamic IP provider 130 may remove current IP session 140 from an active IP session pool, and may record information associated with eNB 120-2, as indicated by reference number 470.

Although FIG. 4 shows exemplary components of network portion 400, in other implementations, network portion 400 may contain fewer, different, differently arranged, or additional components than depicted in FIG. 4. Alternatively or additionally, one or more components of network portion 400 may perform one or more other tasks described as being performed by one or more other components of network portion 400.

Figure 5A:
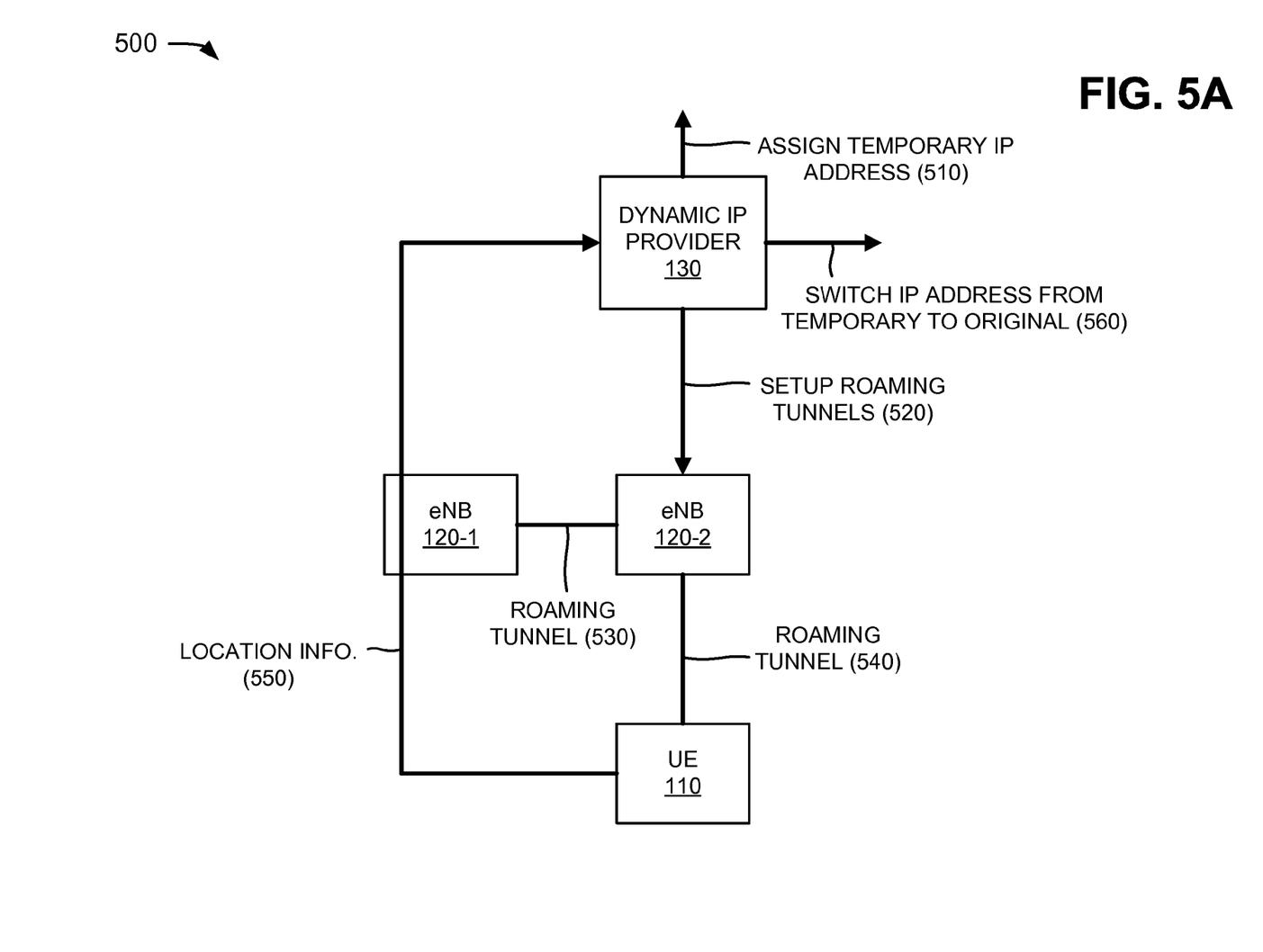
FIGS. 5A and 5B are diagrams of exemplary interactions among components of another exemplary portion of the network depicted in FIG. 1.
Figure 5B:
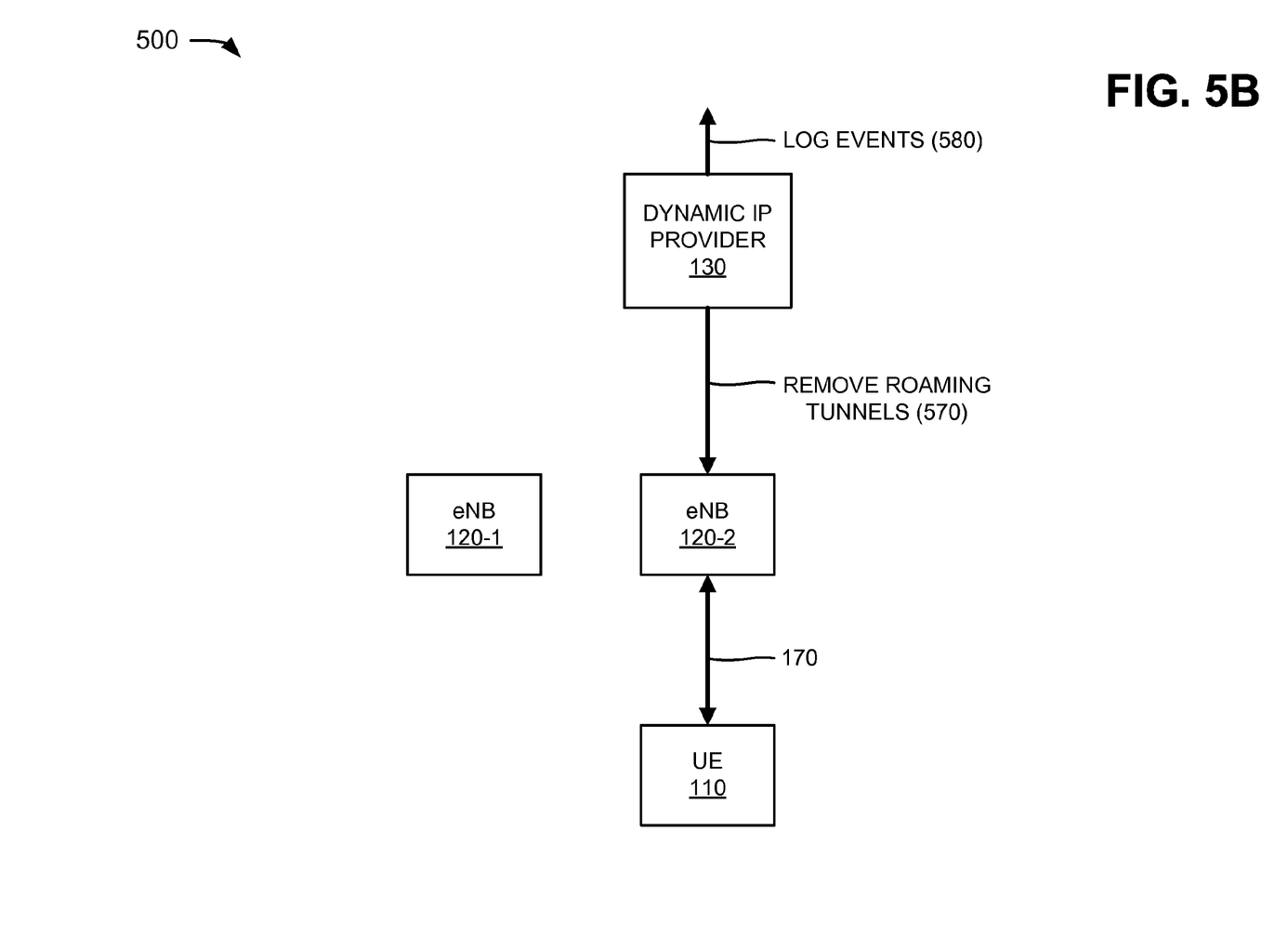

FIGS. 5A and 5B are diagrams of exemplary interactions among components of another exemplary portion 500 of network 100. As illustrated in FIGS. 5A and 5B, exemplary network portion 500 may include UE 110, eNBs 120-1 and 120-2, and dynamic IP provider 130. UE 110 may include the features described above in connection with, for example, FIGS. 1 and 4. eNBs 120-1 and 120-2 may include the features described above in connection with, for example, FIGS. 1, 2, and 4. Dynamic IP provider 130 may include the features described above in connection with, for example, FIGS. 1, 3, and 4.

Exemplary network portion 500 may depict a portion of network 100 after dynamic IP provider 130 sets up requests to establish peer connectivity between UE 110, eNB 120-1, and the optimal eNB 120-2, as indicated by reference number 440 (FIG. 4). As shown in FIG. 5A, once the peer connectivity setup requests have been established between UE 110, eNB 120-1, and eNB 120-2, dynamic IP provider 130 may assign a temporary IP address to UE 110, as indicated by reference number 510. Dynamic IP provider 130 may instruct eNB 120-2 to setup roaming tunnels, as indicated by reference number 520. eNB 120-2 may setup a roaming tunnel 530 with eNB 120-1 and may setup a roaming tunnel 540 with UE 110. Roaming tunnel 530 may enable handover path 150 of current IP session 140 to be established between eNB 120-1 and 120-2. Roaming tunnel 540 may eventually enable new IP session 170 to be established between UE 110 and eNB 120-2.

As further shown in FIG. 5A, dynamic IP provider 130 may receive location information 550 from UE 110 (e.g., via eNB 120-1) when UE 110 begins to transition to a coverage area associated with eNB 120-2. Location information 550 may include information associated with a location (e.g., global positioning system (GPS) coordinates) of UE 110. In one example, dynamic IP provider 130 may continuously receive location information 550 from UE 110 until UE 110 is handed over from eNB 120-1 to eNB 120-2. When UE 110 transitions over to eNB 120-2, dynamic IP provider 130 may switch the temporary IP address assigned to UE 110 to the original IP address associated with UE 110, as indicated by reference number 560.

As shown in FIG. 5B, when UE 110 transitions over to eNB 120-2, new IP session 170 may be established between UE 110 and eNB 120-2. New IP session 170 may preserve current IP session 140 and the original IP address associated with UE 110. Dynamic IP provider 130 may instruct eNB 120-2 to remove roaming tunnels 530 and 540, as indicated by reference number 570, and eNB 120-2 may remove roaming tunnels 530 and 540. Dynamic IP provider 130 may log events associated with the handover of UE 110 from eNB 120-1 to eNB 120-2, as indicated by reference number 580. For example, dynamic IP provider 130 may log information, such as IP session roaming information 410, location information 550, IP sessions associated with UEs, IP addresses associated with UEs, etc.

Although FIGS. 5A and 5B show exemplary components of network portion 500, in other implementations, network portion 500 may contain fewer, different, differently arranged, or additional components than depicted in FIGS. 5A and 5B. Alternatively or additionally, one or more components of network portion 500 may perform one or more other tasks described as being performed by one or more other components of network portion 500. In one exemplary implementation, peering and setup of roaming tunnels 530 and 540 may be established between a particular eNB 120 and two or more other eNBs 120.

Figure 6:
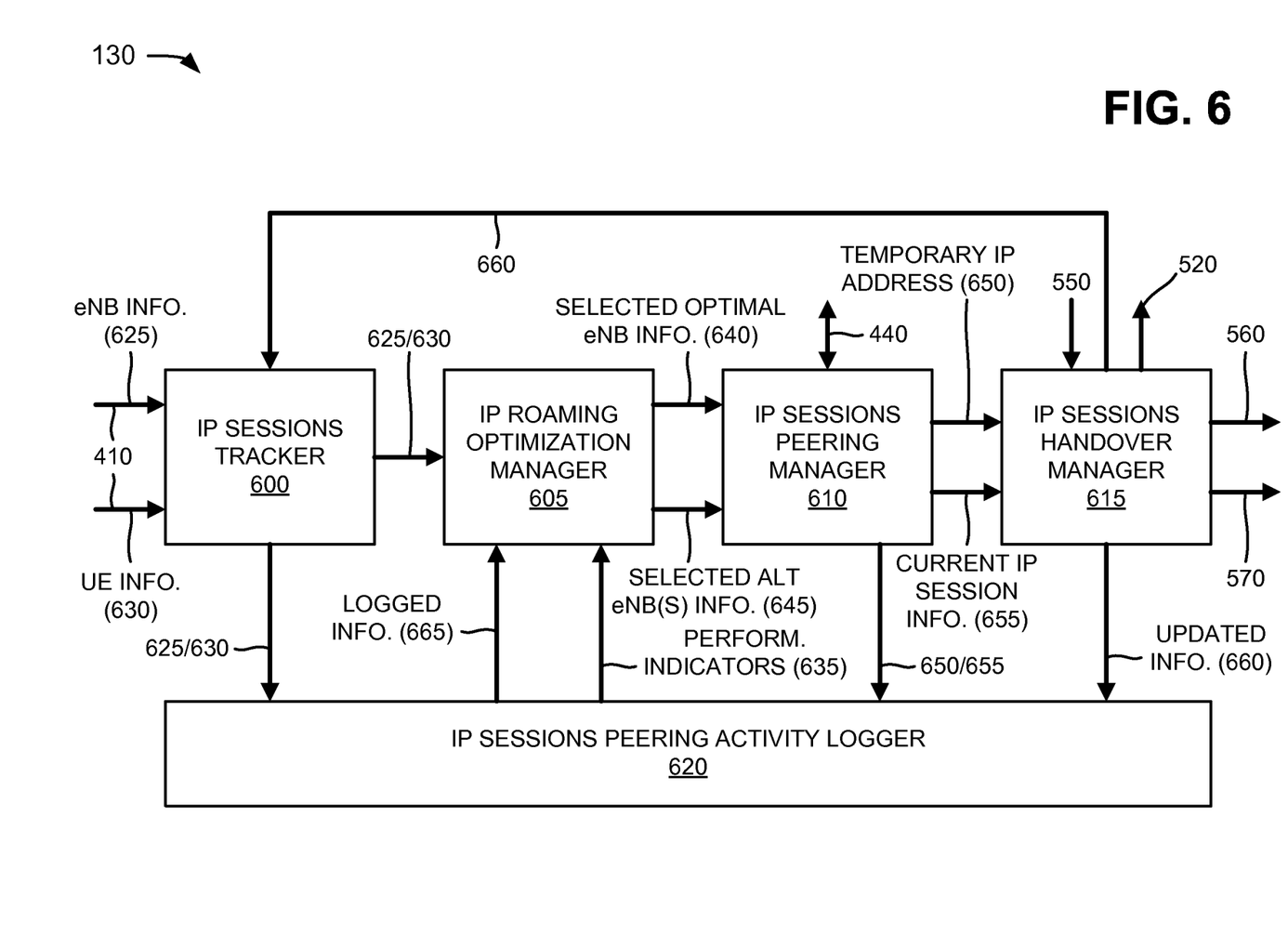
FIG. 6 is a diagram of exemplary functional components of the dynamic IP provider depicted in FIG. 1.

FIG. 6 is a diagram of exemplary functional components of dynamic IP provider 130. In one implementation, the functions described in connection with FIG. 6 may be performed by one or more of the components of device 300 (FIG. 3). As shown in FIG. 6, dynamic IP provider 130 may include an IP sessions tracker 600, an IP roaming optimization manager 605, an IP sessions peering manager 610, an IP sessions handover manager 615, and an IP sessions peering activity logger 620.

IP sessions tracker 600 may include hardware or a combination of hardware and software that may receive eNB information 625 from eNBs 120, and may receive UE information 630 from UEs (e.g., UE 110), via eNBs 120. eNB information 625 may include information associated with eNBs 120, such as load information associated with eNBs 120, information associated with IP sessions handled by eNBs 120, a list of neighbor eNBs 120 that are potential peering points for a UE (e.g., UE 110), etc. UE information 630 may include location coordinates and related roaming data associated with UEs connected to eNBs 120, information associated with IP sessions between UEs and eNBs 120, etc. In one example, eNB information 625 and UE information 630 may correspond to IP session roaming information 410 (FIG. 4). IP sessions tracker 600 may provide eNB information 625 and UE information 630 to IP roaming optimization manager 605 (e.g., for further processing) and to IP sessions peering activity logger 620 (e.g., for storage).

IP roaming optimization manager 605 may include hardware or a combination of hardware and software that may receive eNB information 625 and UE information 630 from IP sessions tracker 600, and may receive performance indicators 635 from IP sessions peering activity logger 620. Performance indictors 635 may include load information associated with eNBs 120, performance information associated with eNBs 120, etc. IP roaming optimization manager 605 may rank eNBs 120 that are candidates for a handover of UE 110 (e.g., from eNB 120-1) based on eNB information 625, UE information 630, and/or performance indicators 635. IP roaming optimization manager 605 may select, from the ranked eNBs 120, an optimal eNB 120 (e.g., eNB 120-2) to which to handover UE 110 (e.g., from eNB 120-1). Alternatively or additionally, IP roaming optimization manager 605 may select, from the ranked eNBs 120, one or more other eNBs 120 (e.g., as alternate eNBs 120 in case the optimal eNB 120-2 malfunctions) to which to handover UE 110. IP roaming optimization manager 605 may provide, to IP sessions peering manager 610, information 640 (e.g., load information, location information, etc.) associated with the selected optimal eNB 120-2 and/or information 645 (e.g., load information, location information, etc.) associated with the one or more alternate eNBs 120.

IP sessions peering manager 610 may include hardware or a combination of hardware and software that may receive information 640 and/or information 645 from IP roaming optimization manager 605, and may setup (e.g., based on information 640/645) requests to establish peer connectivity between UE 110, eNB 120-1 (e.g., UE's 110 current anchoring eNB 120), and the optimal eNB 120-2, as indicated by reference number 440. Once the peer connectivity setup requests have been established between UE 110, eNB 120-1, and eNB 120-2, IP sessions peering manager 610 may provide a temporary IP address 650 (e.g., for UE 110) and current IP session information 655 to IP sessions handover manager 615 (e.g., for further processing) and to IP sessions peering activity logger 620 (e.g., for storage). Current IP session information 655 may include information associated with current IP session 140 established between UE 110 and eNB 120-1.

IP sessions handover manager 615 may include hardware or a combination of hardware and software that may receive temporary IP address 650 and current IP session information 655 from IP sessions peering manager 610, and may instruct eNB 120-2 to setup roaming tunnels, as indicated by reference number 520. IP sessions handover manager 615 may receive location information 550 from UE 110 (e.g., via eNB 120-1) when UE 110 begins to transition to a coverage area associated with eNB 120-2. When UE 110 transitions over to eNB 120-2, IP sessions handover manager 615 may switch temporary IP address 650 to the original IP address associated with UE 110, as indicated by reference number 560. When UE 110 transitions over to eNB 120-2, IP sessions handover manager 615 may instruct eNB 120-2 to remove roaming tunnels 530 and 540, as indicated by reference number 570, and eNB 120-2 may remove roaming tunnels 530 and 540. IP sessions handover manager 615 may provide updated information 660 associated with the handover operation to IP sessions tracker 600 (e.g., for further processing) and to IP sessions peering activity logger 620 (e.g., for storage). Updated information 660 may include, for example, an updated roaming IP address list that may be used for temporarily roaming UEs.

IP sessions peering activity logger 620 may include one or more storage devices that may store information received by and/or provided to dynamic IP provider 130. For example, IP sessions peering activity logger 620 may store logged information 665, such as eNB information 625, UE information 630, temporary IP address 650, current IP session information 655, updated information 660, IP sessions associated with UEs, IP addresses associated with UEs, etc. As further shown in FIG. 6, logged information 665 may be provided to IP roaming optimization manager 605 so that IP roaming optimization manager 605 may increase accuracy and reliability associated with IP session assignment for UEs.

Although FIG. 6 shows exemplary functional components of dynamic IP provider 130, in other implementations, dynamic IP provider 130 may contain fewer, different, differently arranged, or additional functional components than depicted in FIG. 6. In still other implementations, one or more functional components of dynamic IP provider 130 may perform one or more other tasks described as being performed by one or more other functional components of dynamic IP provider 130.

Figure 7:
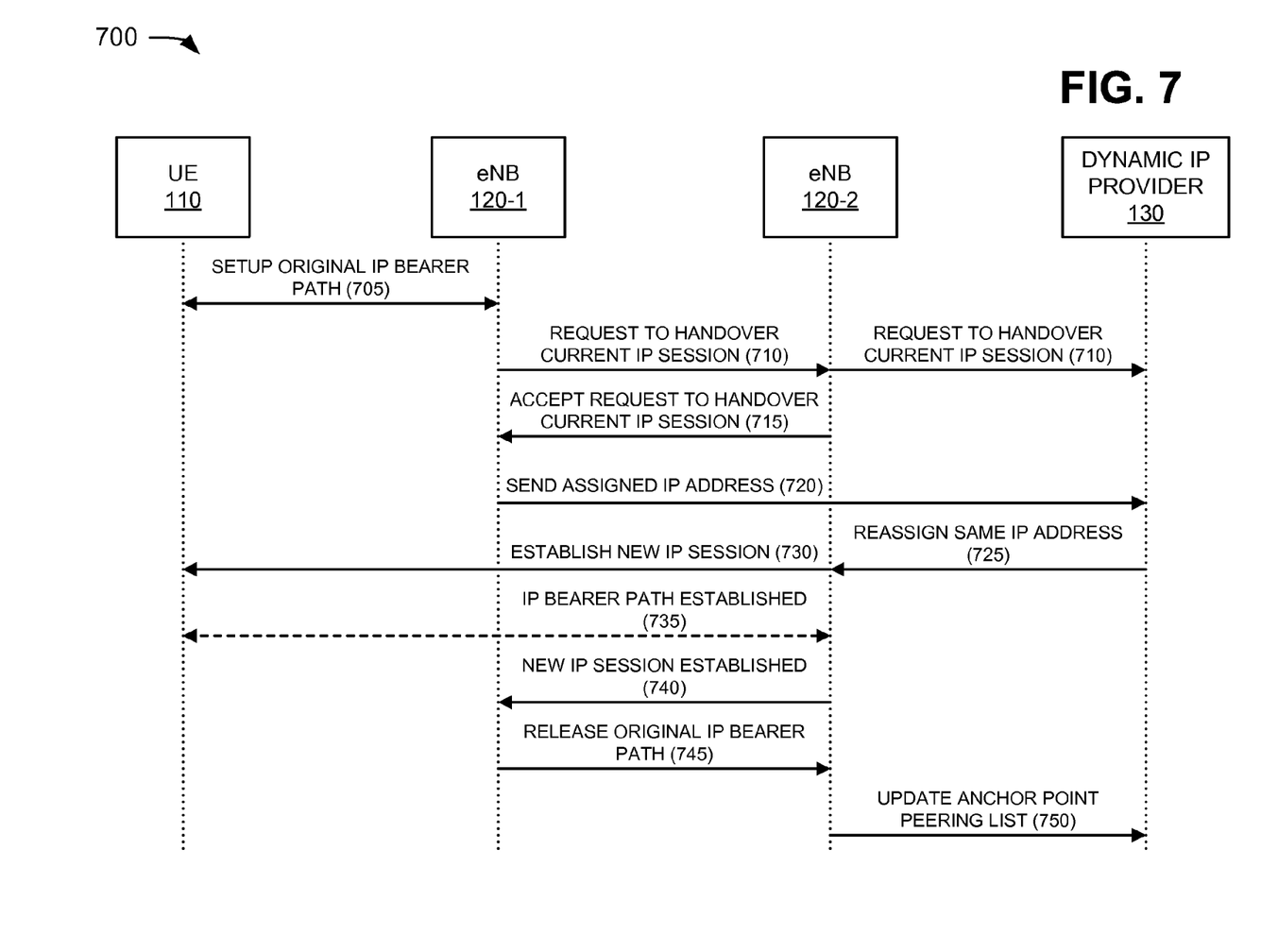
FIG. 7 is a diagram of exemplary interactions among components of still another exemplary portion of the network depicted in FIG. 1.

FIG. 7 is a diagram of exemplary interactions among components of still another exemplary portion 700 of network 100. As shown in FIG. 7, exemplary network portion 700 may include UE 110, eNB 120-1, eNB 120-2, and dynamic IP provider 130. UE 110 may include the features described above in connection with, for example, FIGS. 1 and 4-5B. eNBs 120-1 and 120-2 may include the features described above in connection with, for example, FIGS. 1, 2, and 4-5B. Dynamic IP provider 130 may include the features described above in connection with, for example, FIGS. 1 and 3-6.

As further shown in FIG. 7, UE 110 and eNB 120-1 may setup an original IP bearer path, as indicate by reference number 705. UE 110 may be communicating with eNB 120-1 and may have established current IP session 140 with eNB 120-1. UE 110 may roam from eNB 120-1 to another eNB (e.g., eNB 120-2). For example, UE 110 may physically move from a location that is closest to eNB 120-1 to a location that is closest to eNB 120-2. After moving, UE 110 may best be served by eNB 120-2 (e.g., since it is the closest eNB 120 to UE 110) rather than by eNB 120-1. Therefore, eNB 120-1 may provide, to eNB 120-2, a request 710 to handover current IP session 140, and eNB 120-2 may provide request 710 to dynamic IP provider 130. eNB 120-2 may accept request to handover current IP session 140, as indicated by reference number 715, and eNB 120-1 may send an IP address (e.g., assigned to UE 110) to dynamic IP provider 130, as indicated by reference number 720.

Dynamic IP provider 130 may reassign the same IP address (e.g., assigned to UE 110), and may provide the reassigned IP address to eNB 120-2, as indicated by reference number 725. eNB 120-2 may establish a new IP session with UE 110, as indicated by reference number 730. The new IP session may preserve current IP session 140 and the original IP address associated with UE 110. An IP bearer path may be established between UE 110 and eNB 120-1, as indicated by reference number 735, and eNB 120-2 may inform eNB 120-1 that the new IP session has been established, as indicated by reference number 740. eNB 120-1 may release the original IP bearer path with UE 110, as indicated by reference number 745, and eNB 120-2 may update an anchor point peering list associated with dynamic IP provider 130, as indicated by reference number 750.

Although FIG. 7 shows exemplary components of network portion 700, in other implementations, network portion 700 may contain fewer, different, differently arranged, or additional components than depicted in FIG. 7. Alternatively or additionally, one or more components of network portion 700 may perform one or more other tasks described as being performed by one or more other components of network portion 700.

Figure 8:
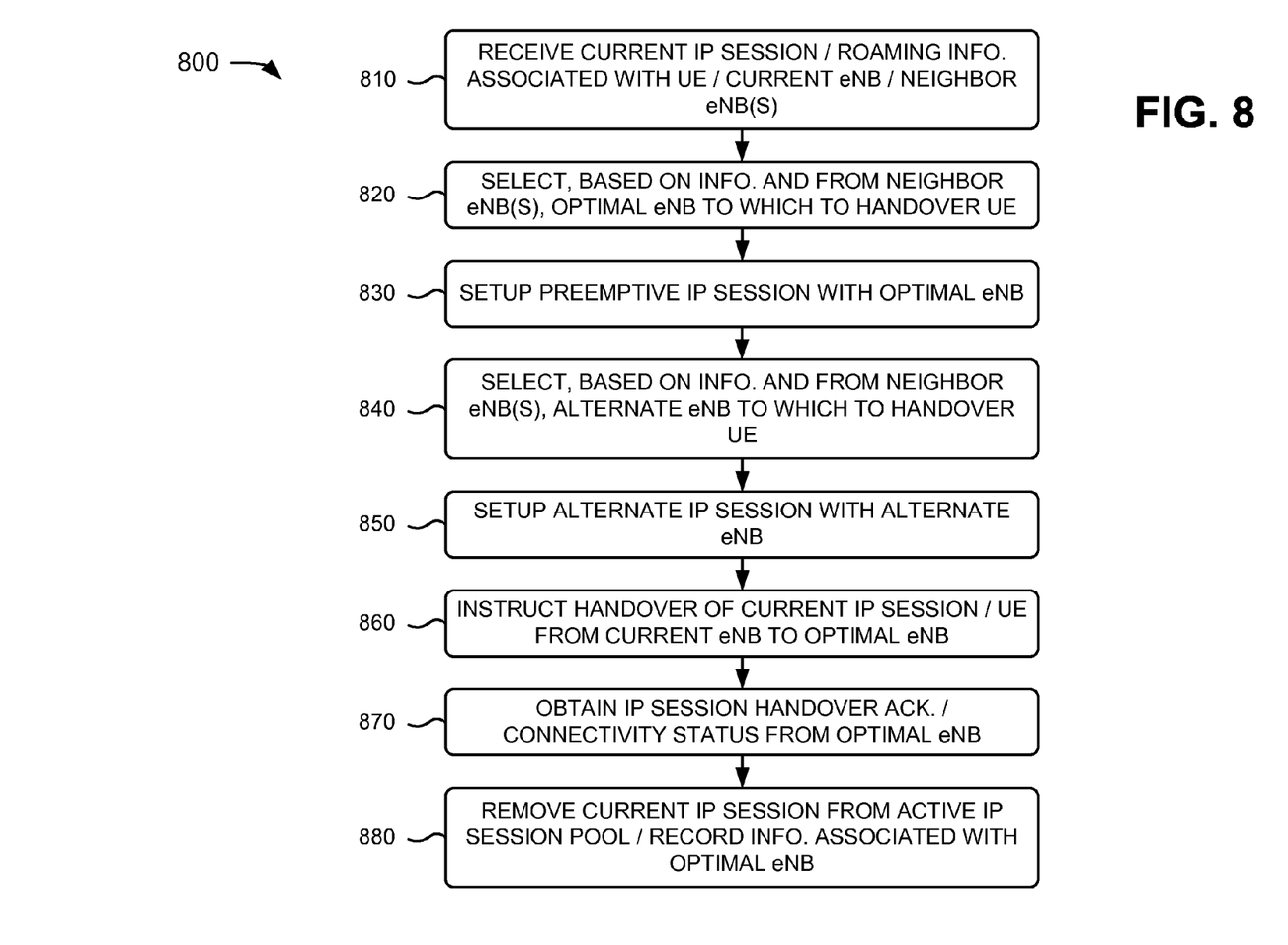
FIGS. 8-10 are flow charts of an exemplary process for permitting a UE to roam from a particular eNB to another eNB by keeping the UE's bearer path anchored to the particular eNB and by preserving the UE's IP session and address according to implementations described herein.
Figure 9:
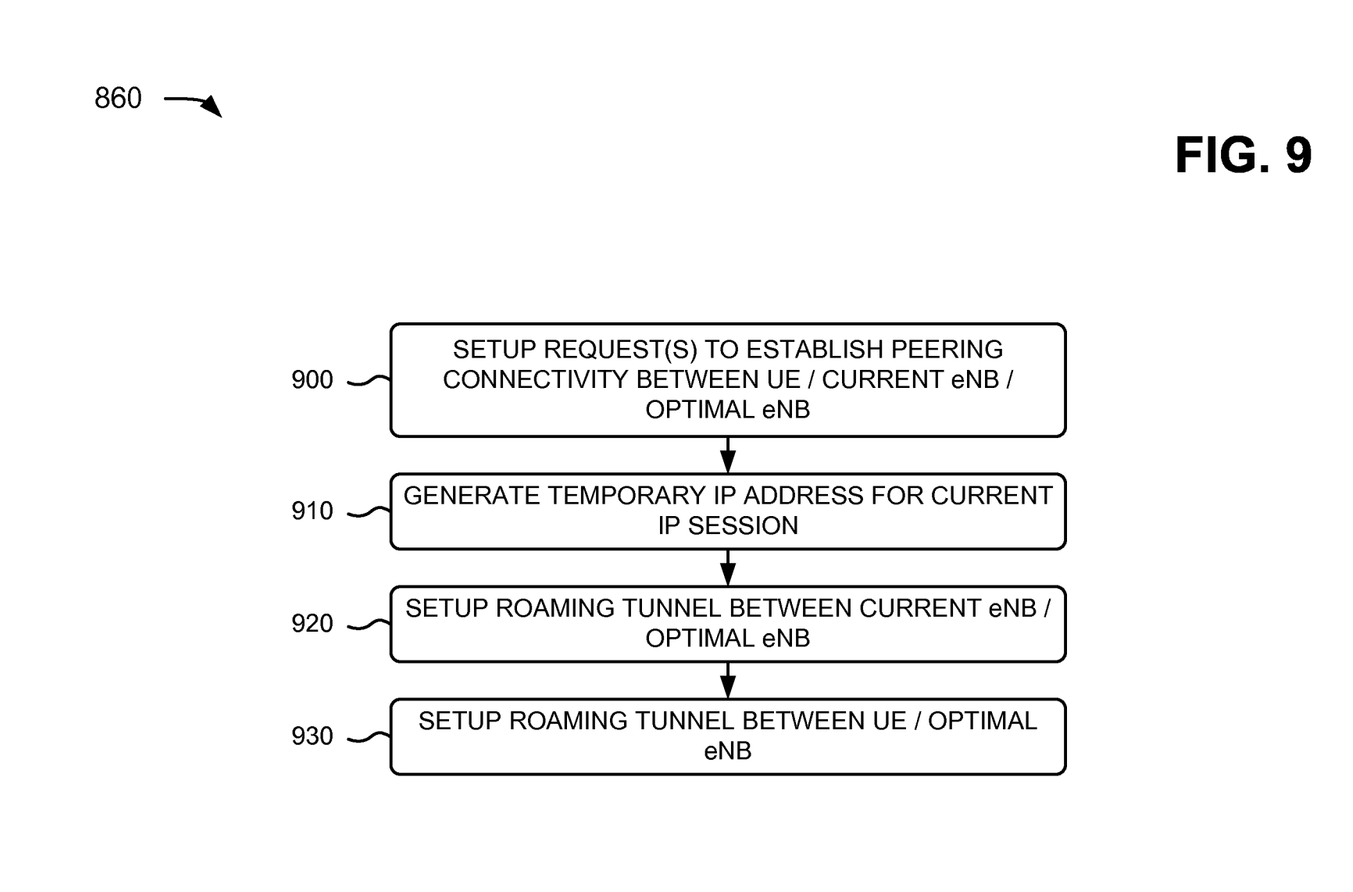
Figure 10:
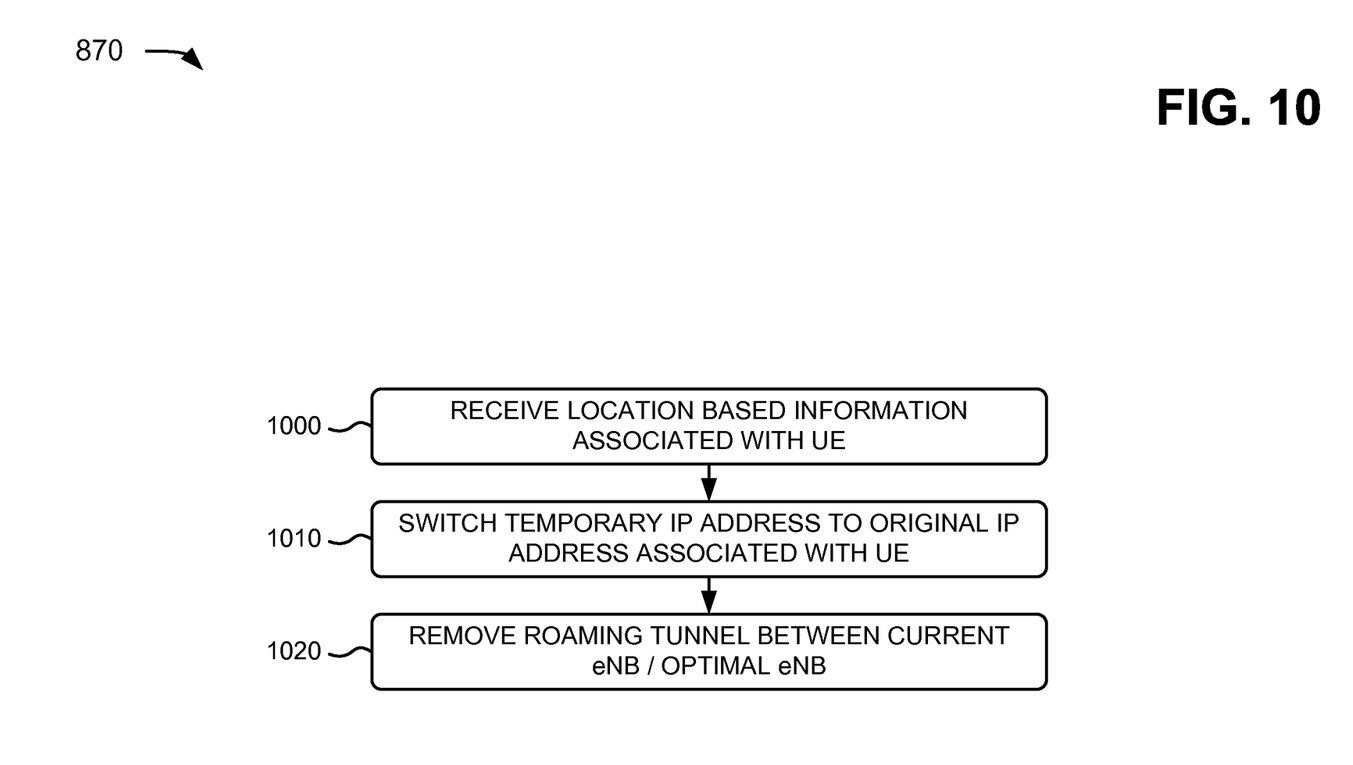

FIGS. 8-10 are flow charts of an exemplary process 800 for permitting a UE to roam from a particular eNB to another eNB by keeping the UE's bearer path anchored to the particular eNB and by preserving the UE's IP session and address according to implementations described herein. In one implementation, process 800 may be performed by dynamic IP provider 130. In another implementation, some or all of process 800 may be performed by another device or group of devices, including or excluding dynamic IP provider 130.

As shown in FIG. 8, process 800 may include receiving a current IP session and roaming information associated with a UE, a current eNB, and a neighbor eNB(s) (block 810), selecting, based on the roaming information and from the neighbor eNB(s), an optimal eNB to which to handover the UE (block 820), and setting up a preemptive IP session with the optimal eNB (block 830). For example, in implementations described above in connection with FIG. 4, dynamic IP provider 130 may receive IP session roaming information 410 from eNBs 120-1, 120-2, and 120-N. IP session roaming information 410 may include location coordinates and related roaming data associated with UEs connected to eNBs 120-1, 120-2, and 120-N, information associated with current IP session 140 between UE 110 and eNB 120-1, etc. Dynamic IP provider 130 may select, based on IP session roaming information 410 and from neighbor eNBs 120 (e.g., eNB 120-2 and 120-N), an optimal eNB 120 (e.g., eNB 120-1) to which to handover UE 110, and may setup preemptive IP session 420 with the optimal eNB 120-2. In one example, dynamic IP provider 130 may cause handover path 150 of current IP session 140 to be established between eNB 120-1 and 120-2, and may cause eNB 120-1 to initiate pre-setup 160 (e.g., with UE 110) of a handover of current IP session 140.

As further shown in FIG. 8, process 800 may include selecting, based on the roaming information and from the neighbor eNB(s), an alternate eNB to which to handover the UE (block 840), and setting up an alternate IP session with the alternate eNB (block 850). For example, in implementations described above in connection with FIG. 4, alternatively or additionally, dynamic IP provider 130 may select, based on IP session roaming information 410 and from neighbor eNBs 120 (e.g., eNB 120-2 and 120-N), an alternate eNB (e.g., eNB 120-N, in case eNB 120-2 is unavailable) to which to handover UE 110, and may setup alternate IP session 430 with the alternate eNB 120-N.

Returning to FIG. 8, process 800 may include instructing a handover of the current IP session and the UE from the current eNB to the optimal eNB (block 860), obtaining an IP session acknowledgement and connectivity status information from the optimal eNB (block 870), and removing the current IP session from an active IP session pool and recording information associated with the optimal eNB (block 880). For example, in implementations described above in connection with FIG. 4, once the peer connectivity setup requests have been established between UE 110, eNB 120-1, and eNB 120-2, dynamic IP provider 130 may instruct a handover of current IP session 140 and UE 110 from eNB 120-1 to the optimal eNB 120-2, and new IP session 170 may be established between UE 110 and eNB 120-2. Dynamic IP provider 130 may obtain handover acknowledgement 450 and handover information 460 from eNB 120-2. Handover acknowledgement 450 may include an acknowledgement that new IP session 170 has been established between UE 110 and eNB 120-2. Handover information 460 may include, for example, connectivity status information associated with UE 110 and eNB 120-2. Dynamic IP provider 130 may remove current IP session 140 from an active IP session pool, and may record information associated with eNB 120-2, as indicated by reference number 470.

Process block 860 may include the process blocks depicted in FIG. 9. As shown in FIG. 9, process block 860 may include setting up one or more request to establish peering connectivity between the UE, the current eNB, and the optimal eNB (block 900), generating a temporary IP address for the current IP session (block 910), setting up a roaming tunnel between the current eNB and the optimal eNB (block 920), and setting up a roaming tunnel between the UE and the optimal eNB (block 930). For example, in implementations described above in connection with FIGS. 4 and 5A, dynamic IP provider 130 may setup requests to establish peer connectivity between UE 110, eNB 120-1 (e.g., UE's 110 current anchoring eNB 120), and the optimal eNB 120-2, as indicated by reference number 440. Once the peer connectivity setup requests have been established between UE 110, eNB 120-1, and eNB 120-2, dynamic IP provider 130 may assign a temporary IP address to UE 110, as indicated by reference number 510. Dynamic IP provider 130 may instruct eNB 120-2 to setup roaming tunnels, as indicated by reference number 520. eNB 120-2 may setup a roaming tunnel 530 with eNB 120-1 and may setup a roaming tunnel 540 with UE 110. Roaming tunnel 530 may enable handover path 150 of current IP session 140 to be established between eNB 120-1 and 120-2. Roaming tunnel 540 may eventually enable new IP session 170 to be established between UE 110 and eNB 120-2.

Process block 870 may include the process blocks depicted in FIG. 10. As shown in FIG. 10, process block 870 may include receiving location based information associated with the UE (block 1000), switching the temporary IP address to an original IP address associated with the UE (block 1010), and removing the roaming tunnel between the current eNB and the optimal eNB (block 1020). For example, in implementations described above in connection with FIGS. 5A and 5B, dynamic IP provider 130 may receive location information 550 from UE 110 (e.g., via eNB 120-1) when UE 110 begins to transition to a coverage area associated with eNB 120-2. Location information 550 may include information associated with a location (e.g., GPS coordinates) of UE 110. When UE 110 transitions over to eNB 120-2, dynamic IP provider 130 may switch the temporary IP address assigned to UE 110 to the original IP address associated with UE 110, as indicated by reference number 560. When UE 110 transitions over to eNB 120-2, new IP session 170 may be established between UE 110 and eNB 120-2. New IP session 170 may preserve current IP session 140 and the original IP address associated with UE 110. Dynamic IP provider 130 may instruct eNB 120-2 to remove roaming tunnels 530 and 540, as indicated by reference number 570, and eNB 120-2 may remove roaming tunnels 530 and 540.

Implementations described herein may provide systems and/or methods that may permit a UE to roam from a particular eNB to at least another eNB by anchoring the UE's bearer path to the particular eNB and by preserving the UE's IP session and IP address. The systems and/or methods may enable the anchoring eNB to inherit the anchoring functionality and intelligence of a PGW so that the anchoring eNB may act as a localized anchor point to the UE. The systems and/or methods may permit the anchoring eNB to handle a roaming UE and to seamlessly reassign the same IP address to the UE without losing the UE's bearer path or an original configuration of the UE's IP session setup. The systems and/or methods may enable eNBs to keep track of IP sessions, IP addresses, and/or corresponding roaming information associated with UEs.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-10, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a device, data associated with a mobile communication device that is connected to a first eNodeB,
      the data including information associated with an Internet protocol (IP) session between the mobile communication device and the first eNodeB, one or more location coordinates associated with the mobile communication device, and roaming data associated with the mobile communication device;
   receiving, by the device, performance indicators associated with a plurality of eNodeBs,
      the plurality of eNodeBs including eNodeBs that are candidates for a handover;
   ranking, by the device, the plurality of eNodeBs based on the data and the performance indicators;
   selecting, by the device, a second eNodeB, from the ranked plurality of eNodeBs, for the handover; and
   providing, by the device, information associated with the second eNodeB.

2. The method of claim 1, further comprising:
   selecting one or more other eNodeBs, from the ranked plurality of eNodeBs, as alternates to the second eNodeB; and
   providing information associated with the one or more other eNodeBs.

3. The method of claim 1, where the information associated with the second eNodeB includes one or more of load information associated with the second eNodeB or location information associated with the second eNodeB.

4. The method of claim 1, where the performance indicators include one or more of load information associated with the plurality of eNodeBs or performance information associated with the plurality of eNodeBs.

5. The method of claim 1, further comprising:
receiving particular information associated with other IP sessions handled by the plurality of eNodeBs,
where ranking the plurality of eNodeBs includes:
ranking the plurality of eNodeBs based on the data, the performance indicators, and the particular information.

6. The method of claim 1, further comprising:
receiving additional mobile communication device information associated with the mobile communication device that is connected to the first eNodeB,
where ranking the plurality of eNodeBs includes:
ranking the plurality of eNodeBs based on the data, the performance indicators, and the additional mobile communication device information.

7. The method of claim 1, further comprising:
receiving load information associated with the plurality of eNodeBs,
where ranking the plurality of eNodeBs comprises:
ranking the plurality of eNodeBs based on the roaming data, the performance indicators, and the load information.

8. A non-transitory computer-readable medium storing instructions, the instructions comprising:
one or more instructions that, when executed by at least one processor, cause the at least one processor to:
receive mobile communication device information associated with a plurality of mobile communication devices that are connected to a plurality of eNodeBs, the mobile communication device information including information associated with Internet protocol (IP) sessions between the plurality of mobile communication devices and the plurality of eNodeBs, one or more location coordinates associated with the plurality of mobile communication devices, and roaming data associated with the plurality of mobile communication devices;
receive performance indicators associated with the plurality of eNodeBs;
determine, based on the mobile communication device information and the performance indicators, a ranking for particular eNodeBs, of the plurality of eNodeBs, that are candidates for a handover of a mobile communication device of the plurality of mobile communication devices;
select, from the particular eNodeBs and based on the ranking for the particular eNodeBs, an eNodeB to which to handover the mobile communication device; and
provide information associated with the eNodeB.

9. The non-transitory computer-readable medium of claim 8, where the one or more instructions to determine the ranking for the particular eNodeBs comprise:
one or more instructions that, when executed by the at least one processor, cause the at least one processor to:
receive additional mobile communication device information associated with the plurality of mobile communication devices that are connected to the plurality of eNodeBs, and
determine the ranking for the particular eNodeBs based on the performance indicators, the mobile communication device information, and the additional mobile communication device information.

10. The non-transitory computer-readable medium of claim 8, where the instructions further comprise:
one or more instructions that, when executed by the at least one processor, cause the at least one processor to:
select, from the particular eNodeBs and based on the ranking for the particular eNodeBs, one or more other eNodeBs as alternates to the eNodeB; and
provide information associated with the one or more other eNodeBs.

11. The non-transitory computer-readable medium of claim 10, where a particular eNodeB, of the one or more other eNodeBs, is used for another handover of the mobile communication device when the eNodeB malfunctions.

12. The non-transitory computer-readable medium of claim 8, where the information associated with the eNodeB is used to establish peer connectivity between the eNodeB, the mobile communication device, and a current eNodeB to which the mobile communication device is connected.

13. The non-transitory computer-readable medium of claim 8,
where the instructions further comprise:
one or more instructions that, when executed by the at least one processor, cause the at least one processor to:
receive eNodeB information associated with the plurality of eNodeBs, and
where the one or more instructions to determine the ranking for the particular eNodeBs comprise:
one or more instructions that, when executed by the at least one processor, cause the at least one processor to:
determine the ranking for the particular eNodeBs based on the mobile communication device information, the performance indicators, and the eNodeB information.

14. The non-transitory computer-readable medium of claim 13, where the eNodeB information includes load information associated with the plurality of eNodeBs.

15. The non-transitory computer-readable medium of claim 8, where the one or more instructions to determine the ranking comprise:
one or more instructions that, when executed by the at least one processor, cause the at least one processor to:
receive particular information associated with other IP sessions handled by the plurality of eNodeBs, and
rank the particular eNodeBs based on the mobile communication device information, the performance indicators, and the particular information.

16. A system comprising:
one or more processors to:
receive first information associated with a plurality of mobile communication devices that are connected to a plurality of eNodeBs,
the first information including:
one or more location coordinates associated with the plurality of mobile communication devices,
roaming data associated with the plurality of mobile communication devices, and
information associated with Internet protocol (IP) sessions between the plurality of mobile communication devices and the plurality of eNodeBs;
receive second information associated with the plurality of eNodeBs,
the second information including performance information associated with the plurality of eNodeBs;

determine, based on the first information and the second information, a ranking for particular eNodeBs, of the plurality of eNodeBs, that are candidates for a handover of a mobile communication device of the plurality of mobile communication devices;

identify an eNodeB, of the particular eNodeBs, to which to handover the mobile communication device based on the ranking for the particular eNodeBs; and provide information associated with the eNodeB.

17. The system of claim 16, where the one or more processors are further to:

identify one or more other eNodeBs, from the particular eNodeBs, as alternates to the eNodeB; and provide information associated with the one or more other eNodeBs.

18. The system of claim 16, where the information associated with the eNodeB is used to establish peer connectivity between the eNodeB, the mobile communication device, and a current eNodeB to which the mobile communication device is connected.

19. The system of claim 16, where the second information further includes load information associated with the plurality of eNodeBs.

20. The system of claim 16, where the second information further includes information associated with other IP sessions handled by the plurality of eNodeBs.

* * * * *